(12) United States Patent
Simmons et al.

(10) Patent No.: US 6,683,317 B1
(45) Date of Patent: Jan. 27, 2004

(54) ELECTRICALLY INSULATING VACUUM COUPLING

(75) Inventors: Jonathon Yancey Simmons, San Jose, CA (US); Andrew Devaney, Slinfold (GB)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 10/278,998

(22) Filed: Oct. 24, 2002

(51) Int. Cl.[7] .................................................. H01J 37/08
(52) U.S. Cl. ............................... 250/492.21; 250/492.3
(58) Field of Search .................................. 250/288, 289, 250/423 R, 492.3, 492.2, 492.21, 441.11; 315/111.81

(56) References Cited

U.S. PATENT DOCUMENTS 6,278,111 B1 * 8/2001 Sheehan et al. ............ 250/288
6,452,338 B1 * 9/2002 Horsky ....................... 250/427

* cited by examiner

*Primary Examiner*—John R. Lee
*Assistant Examiner*—James P. Hughes
(74) *Attorney, Agent, or Firm*—Boult Wade Tennant

(57) ABSTRACT

An electrically insulating vacuum coupling for use in an ion implanter for connecting any two parts of the vacuum chamber housing together while maintaining the electrical potentials of the two parts. The coupling comprises an inner sleeve of ceramic material (e.g. $Al_2O_3$) and an outer sleeve of a polymer/litharge mixture. The polymer may be a urethane polymer. Litharge is included in the material of the outer sleeve to absorb x-rays produced within the vacuum chamber. The coupling is particularly useful for coupling an ion source to the main housing of the vacuum chamber

8 Claims, 3 Drawing Sheets

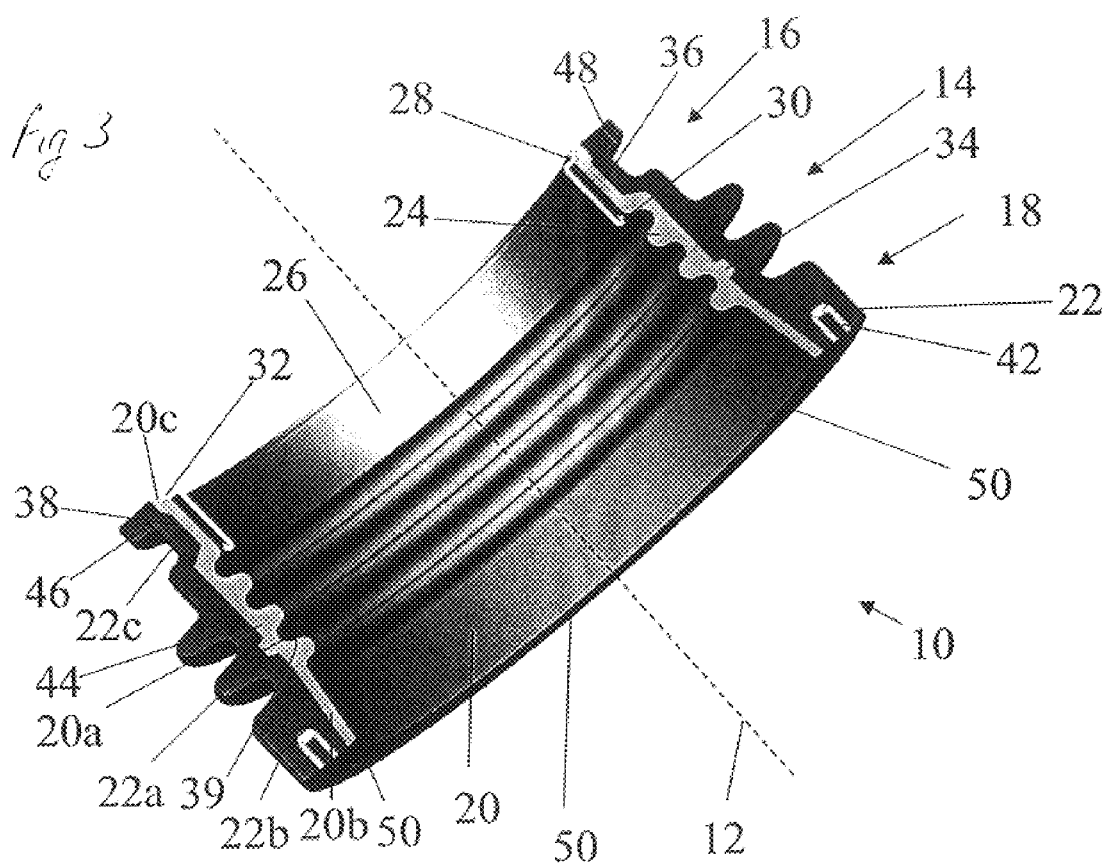

ELECTRICALLY INSULATING VACUUM COUPLING

FIELD OF THE INVENTION

This invention is concerned with electrically insulating vacuum couplings. Although the couplings of the invention have general application, embodiments have specific application to coupling together parts of the vacuum enclosure of an ion implanter which has to be maintained at different electrical potentials, such as the ion source and the mass analyzing magnet of the implanter.

BACKGROUND OF THE INVENTION

In various instruments which have vacuum enclosures, there can be a need to maintain different parts of the enclosure at different operational electrical potentials. In particular with ion implanters, it is normal for the ion source itself to be held at a substantial positive potential of more than 10 kV relative to downstream parts of the implanter, such as the mass analyser magnet and the process chamber in which silicon wafers are implanted. In ion implanters it is known to provide an electrically insulating bushing or vacuum coupling which interconnects the ion source and the mass analyser magnet. Such bushings or couplings are typically made of a polymeric material loaded with litharge (lead monoxide). The presence of litharge in the insulating material is to screen out x-rays which may be produced within the ion source extraction arrangement by impact of high energy electrons on the various components of the ion source.

An example of bushing or vacuum coupling is illustrated in U.S. Pat. No. 6,331,713 in which the bushing is used to mount the ion source housing relative to a part of the vacuum enclosure housing extraction electrodes immediately in front of the mass analyser magnet of an ion implanter.

It has been found that the lifetime of prior art electrically insulating vacuum couplings, especially when used in the harsh environment of an ion implanter, is limited.

SUMMARY OF THE INVENTION

It is an object of this invention to improve the useful lifetime of electrically insulating vacuum couplings made of polymeric materials, particularly polymeric materials containing litharge as used in ion implanters.

The present invention provides an electrically insulating vacuum coupling for interconnecting parts of a vacuum enclosure which are to be maintained at different electrical potentials, the coupling having an inner surface layer exposed to the vacuum formed of a first electrically insulating material which is resistant to damage by electrical arcing, and a body surrounding the inner surface formed of a second electrically insulating material which is x-ray absorbent.

Preferably the first material is ceramic which may be glazed and/or polished to provide an easily cleaned inner surface. The second material is preferably a polymeric material containing litharge, or another heavy element or compound known to be an x-ray absorber.

With this construction the lifetime of the coupling is substantially improved since the internal surface is substantially resistant to the effects of arcing which can cause damage such as carbonization of an inner surface of a polymeric/litharge material.

BRIEF DESCRIPTION OF THE DRAWINGS

Examples of the present invention will now be described with reference to the accompanying drawings in which:

FIG. 3 is a cross-sectional view of an electrically insulating vacuum coupling embodying the invention which may be employed in the ion source of FIG. 2.

DETAILED DESCRIPTION OF THE PREFERRED EMBODIMENTS

Figure 1:
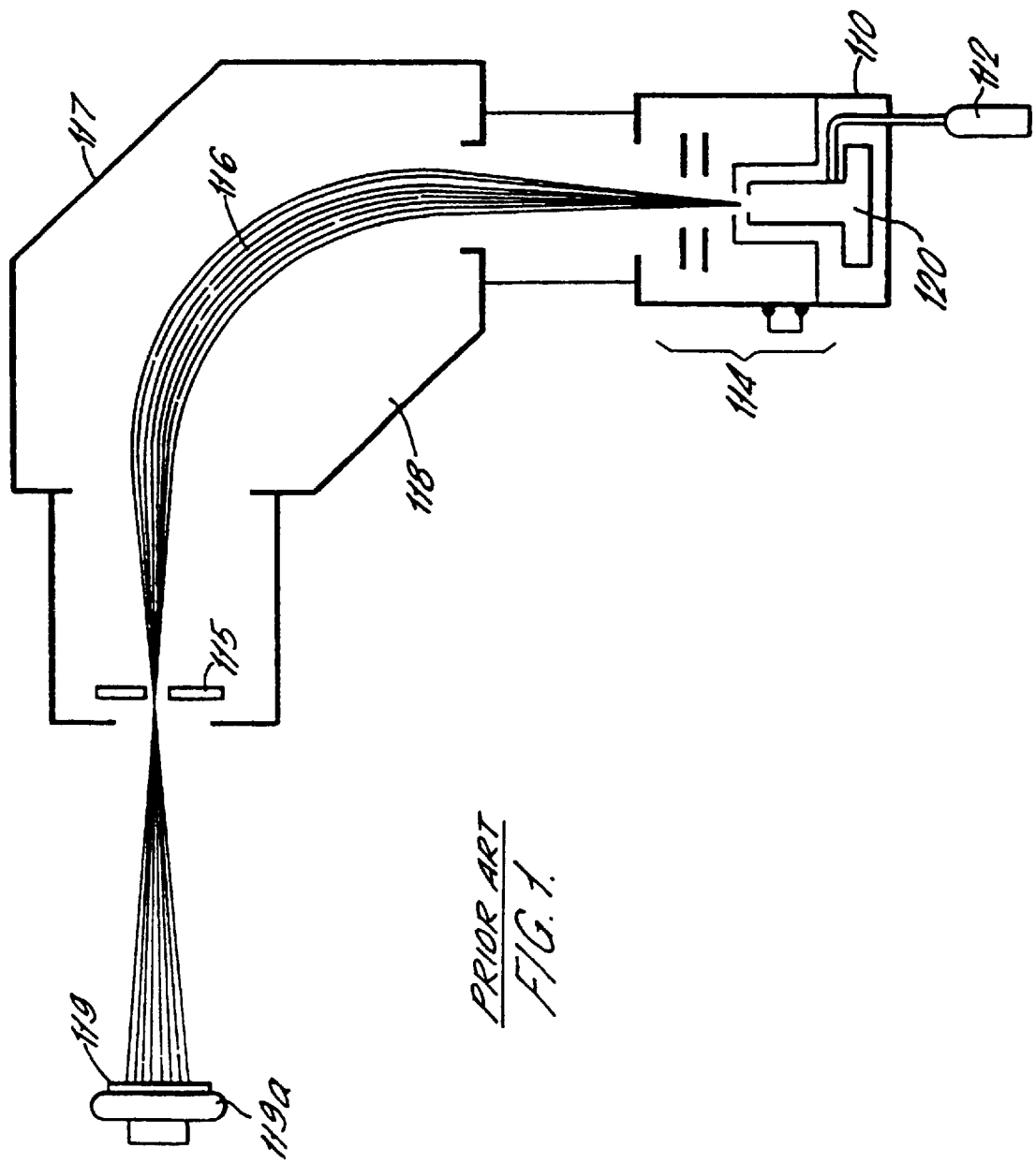
FIG. 1 is a schematic illustration of an ion implanter which may incorporate an embodiment of the present invention.

Referring to FIG. 1, an ion implanter includes an ion source 120 fed with a feed gas containing atoms or molecules of desired species from a gas bottle 112. The ion source has an extraction assembly shown generally at 114 from which an ion beam 116 is produced. The ion beam 116 is directed through a mass analyser 117 including an analyzing magnet 118. Ions of the required mass-to-charge ratio follow a curved path through the analyser magnet 118 and pass through a mass selection slit 115 before impinging upon a target wafer 119 mounted on a wafer holder 119a.

As will be appreciated the above elements are all housed in a vacuum housing although, for clarity, this is not shown in FIG. 1.

Figure 2:
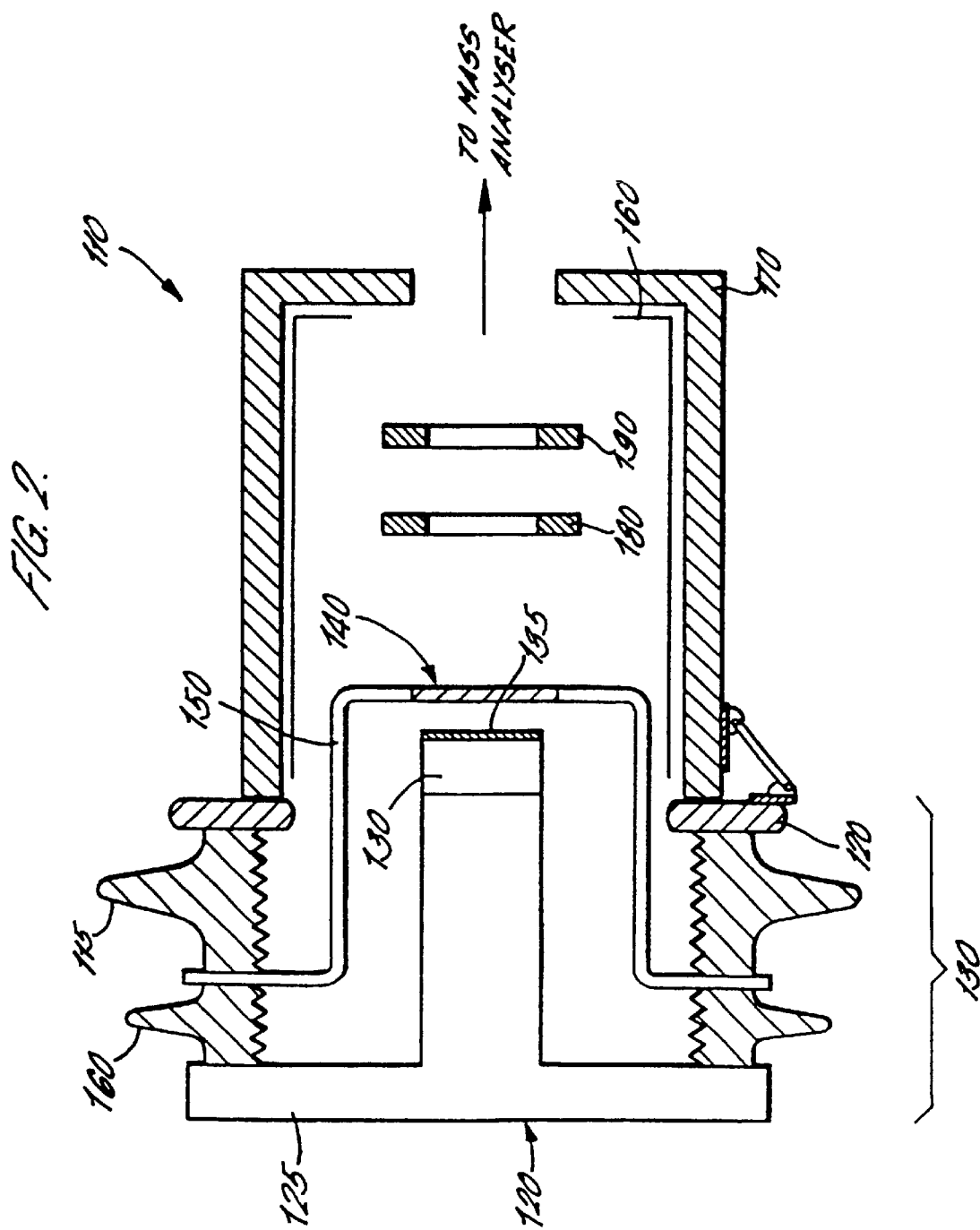
FIG. 2 is a schematic illustration in cross-sections of an ion source of the implanter of FIG. 1, incorporating insulating vacuum couplings embodying the invention.

FIG. 2 illustrates in more detail the ion source assembly 110. The assembly 110 comprises an ion source 120 which may be of any suitable type such as a Freeman or Bernas source. In FIG. 2, the source 120 has a base portion 125 and a generally elongate portion upon that base. The end of the generally elongate portion contains an arc chamber 130. The arc chamber 130 has an aperture therein to allow ions generated within the chamber to be drawn out by an extraction electric field provided by a biased extraction electrode 140 mounted immediately adjacent the face plate 135. The extraction electrode 140 is supported next to the face plate 135 by an extraction electrode support member 150.

As will be known to those skilled in the field of ion implanters, the ion source assembly 120 is usually held at a positive potential of at least 10 kV relative to ground. In order to draw the positive ions away from the arc chamber 130, the extraction electrode 140 is held at a potential which is negative relative to the potential of the ion source 120. Extraction potentials ranging from 1 or 2 kV to 20 kV or more are known.

The extraction electrode support member 150 is electrically insulated from the base of the ion source 120 by a first high voltage bushing or vacuum coupling 160. The coupling 160 acts not only to electrically separate the extraction electrode support member 150 from the base portion 125 of the ion source 120 but also to support the extraction of electrodes 150 mechanically relative to the ion source base portion 125.

The aperture of the arc chamber 130 and the extraction electrode 140 extend into a vacuum chamber 170 which contains a suppression electrode 180 and a ground electrode 190. The suppression electrode 180 is typically held at a negative potential, up to a few kV, relative to the ground potential to prevent the extraction system from drawing neutralising electrodes from the ion beam downstream of the ground electrode 190.

The chamber 170 and the ground electrode 190 are typically at ground potential. The extraction electrode support member 150 is in turn insulated from the chamber 170 by a second high voltage bushing or vacuum coupling 115. This high voltage bushing 115 not only insulates the extraction electrode support member 150 from the chamber 170 but also provides mechanical support both for the extraction electrode support member 150 itself, and also for the outer bushing 160 and the ion source 120.

The vacuum couplings or bushings 160 and 115 are connected at each end to the respective parts of the apparatus by clamps or bolts in ways well known in this field.

The coupling 10 illustrated is shown in half section and is annular and substantially cylindrical in shape and is symmetrical about an axis 12. The coupling is designed to fit between the base flange 125 of the ion source 120 and the electrode support member 150 and a similar coupling is designed to fit between the member 150 and the vacuum enclosure portion or chamber 170.

The coupling comprises an intermediate portion 14 and two axial end portions 16 and 18.

The coupling 10 comprises an inner sleeve 20 and an outer sleeve 22 which mates with the inner sleeve in that, once formed and positioned around the inner sleeve, the two sleeves form a single integral unit, namely the coupling 10.

Thus, each of the two sleeves has an intermediate portion 20a and 22a and first and second axial end portions 20b, 20c and 22b, 22c respectively.

The intermediate portion 20a of the inner sleeve 20 is formed with a plurality of annular ribs 24 which are spaced apart axially and, with spaces between the ribs, define a cross-section, which is of substantially sinusoidal form. These ribs serve to strengthen the structure of the inner sleeve 20 of the coupling 10 between its end portions 20b, 20c.

The annular interior surface of the end portion 20b tapers inwardly so that the annular surface is slightly frusto-conical.

The opposite end portion 20c of the inner sleeve 20 is formed with a cylindrical inner surface which is provided with an internal metal band 26 as reinforcement for the end portion 20c. This metal band has annular edge portions 28 and 30 that are turned outwardly of the annulus, edge portion 30 engaging an inner annular edge of the cylindrical inner surface of the end portion 20c while edge portion 28 sits within a shouldered annular edge portion 32 of the end portion 20c.

The internal surface of the end portion 20c is of a diameter that is substantially equal to the innermost internal diameter of the ribs 24, while that of the end portion 22 is outwardly flared, as previously mentioned, towards the adjacent end of the coupling.

The outer surface of the inner sleeve 20 is continuous along the end portion 22 and intermediate portion 14 save for an annular rib extending circumferentially around the intermediate portion and providing, as hereinafter described, a key 34 for securing the inner sleeve 20 to the outer sleeve 22.

The end portion 22 of the inner sleeve 20 is of substantially uniform thickness and so the outer surface thereof follows the same taper as that of the internal surface.

The external surface of the end portion 20c of the inner sleeve has an annular recess 36 formed therein which accommodates an internal rib 38 of the end portion 22c of the outer sleeve 22 to assist with keying the outer sleeve 22 with the inner sleeve 20 as hereinafter described.

The inner sleeve is formed of a material comprising a ceramic material which is selected to be resistant to the chemical environment in which the coupling is to be located. The material comprising the ceramic material is also selected to be resistant to its electrical environment and in particular is resistant to carbonization or other damage by electrical arcing. The internal surface of the inner sleeve 20 may be glazed to assist with such resistance and to provide a smooth surface, so that the surface is easy to clean. Alternatively, or as well, the internal surface may be polished.

The materials which we have found to be suitable for use in forming the inner sleeve are selected from ceramic materials which are capable of withstanding the chemical environment in which they are used as well as the temperatures and electrical environment to which they are exposed in operation. Such ceramics include aluminium oxide ($Al_2O_3$), silicon carbide, boron nitride, tungsten carbide and similar ceramic materials. The precise ceramic selected will be dependent upon the electrical, thermal and chemical properties required in any given intended use.

The glaze applied to the ceramic material is preferably silicon dioxide. Silicon dioxide is especially suitable because it is economical, has good heat resistance, a high electrical resistance, a low coefficient of expansion and has good resistance to chemical action.

The inner sleeve can be formed by compression moulding and firing and/or sintering the material and may be admixed with a binding agent, prior to forming in the mould, in order to enhance its strength.

In another embodiment, the inner sleeve is formed of glass.

The outer sleeve 22 has an internal surface which is completely complementary to the outer surface of the inner sleeve 20. Thus it has an annular recess 39 to accommodate the annular rib 34 of the inner sleeve 20 and the internal rib 38 which seats within the annular recess 36.

The outer sleeve 22 is substantially thicker radially than the inner sleeve 20 and is formed by moulding around the inner sleeve. The end portion 22b of the outer sleeve is shaped as a collar which has a reinforcing band 42 embedded therein. The intermediate portion 22a is formed with two annular, axially-spaced ribs 44 which provide rigidity to the outer sleeve 22, while, as aforesaid, the end portion 22c providing the internal rib 38 is recessed externally so that the thickness of the end portion is substantially constant. At its axial extremity, the end portion 22c is formed as an end flange 46.

The flange is provided with a sequence of spaced axial bores providing bolt holes 48 through which bolts can be passed to secure and seal the flange, and thus the coupling 10, to the part of the vacuum chamber housing onto which it is to be mounted. At the opposite end of the coupling, similar bores providing bolt holes 50 are provided for bolts for attachment of the coupling to a further part of the housing or an ion or electron source (not shown), again in sealed engagement therewith.

The outer sleeve 22 is formed of a material comprising polymeric material and a material which is both x-ray absorbent and resistant to the electrical environment in which it is used. The polymeric material may comprise any suitable polymer or copolymer material, such as a urethane polymer or copolymer, which is capable of being formed in the required geometry of the coupling and has a coefficient of thermal expansion which is the same as or close to that of the material of the inner sleeve so that the coherence of the coupling is maintained in use. While the x-ray absorbent material may comprise, for example, compounds of lead such as lead monoxide, or litharge, other suitable x-ray absorbent materials may also be used.

The material of the outer sleeve is prepared by admixing the polymer material with the x-ray absorbent material and then forming the composite material in a mould as by injection moulding around the inner sleeve, which acts as a core in the mould, and around the reinforcing band 42. We have found that a mixture of polymeric material and x-ray absorbing material comprising about 10% to about 35% polymeric material is satisfactory.

A further embodiment of a coupling according to the present invention can be provided by a ceramic sleeve such as the inner sleeve 20 shown in the drawing but having a coating of the second material formed on the radially external surface of the sleeve instead of having an outer sleeve formed thereon, provided that the external coating is of sufficient thickness to absorb x-radiation passing through the ceramic sleeve.

A further alternative embodiment of a coupling according to the present invention can be provided by a sleeve formed of the second material having a coating of the first ceramic material formed e.g. by flame spraying, on the radially inner surface of the sleeve. In this case, the ceramic coating must be of sufficient thickness to provide both electrical insulation and thermal insulation so that the sleeve is not adversely affected particularly by heat transfer through the coating.

Yet another form of coupling embodying the present invention may comprise a single hollow body formed of heat-insulating (e.g. ceramic) material having x-ray absorbent material surrounding it or embedded in it, and having electrically insulating end regions, for example by providing a coating or layer of electrically insulating material around the end regions of the coupling body.

The above described embodiment of the invention is particularly for use in mounting the ion source to the rest of the housing of an ion implanter. In this connection it should be understood that the coupling may be made in two parts, the first part being coupled directly to the ion source structure containing the arc chamber of the ion source and a second part connected directly to the rest of the ion implanter. The first and second parts may themselves then be connected together, in series, with a mounting flange between them for mounting one of the extraction electrodes in front of the arc chamber of the ion source. The extraction electrode held in this way can be at a potential which is different both from the ion source itself and from the rest of the ion implanter.

It should be understood also that couplings embodying the invention may be used for connecting any two parts of a vacuum enclosure which can be at different electrical potentials when in operation. Thus, the coupling may connect a first chamber of the vacuum enclosure to a second chamber of the vacuum enclosure, where the two chambers are, in use, at different electrical potentials. Instead, however, the coupling may be used to connect an electrode connection mounting, for example, in the wall of a chamber of the vacuum enclosure. References to "parts of a vacuum enclosure" heretofore and in the following claims should be construed to encompass such "parts" whether they are themselves chambers of the vacuum enclosure, i.e. parts which have an interior volume forming part of the overall vacuum enclosure, or simply structures or mountings for structures extending into the vacuum enclosure.

Furthermore, although the embodiments of the invention particularly described above are for use in ion implanters, it will be understood that the invention also covers electrically insulating vacuum couplings which may be used in other apparatus incorporating vacuum enclosures for which different parts of the enclosure may be held at different electrical potentials. Examples of other applications include plasma deposition chambers, particle accelerators and mass spectrometers.

What is claimed is:

1. An electrically insulating vacuum coupling for interconnecting parts of a vacuum enclosure which are to be maintained at different electrical potentials, the coupling having an inner surface layer exposed to the vacuum formed of a first electrically insulating material which is resistant to damage by electrical arcing, and a body surrounding the inner surface formed of a second electrically insulating material which is x-ray absorbent.

2. A vacuum coupling as claimed in claim 1, wherein said first material is ceramic.

3. A vacuum coupling as claimed in claim 2, wherein the inner surface of said surface layer is polished.

4. A vacuum coupling as claimed in claim 2, wherein the inner surface of said surface layer is glazed.

5. A vacuum coupling as claimed in claim 1, wherein said second material is a polymeric material containing litharge.

6. A vacuum coupling as claimed in claim 1, comprising an inner sleeve of said first material having said body of said second material moulded on the outside thereof.

7. A vacuum coupling as claimed in claim 1, wherein said inner layer comprises a coating of said first material on an inner surface of said body of said second material.

8. A vacuum coupling as claimed in claim 2, wherein the ceramic is selected from the group comprising alumina, silicon carbide, boron nitride and tungsten carbide.

* * * * *